(12) United States Patent
Doing et al.

(10) Patent No.: US 9,395,992 B2
(45) Date of Patent: Jul. 19, 2016

(54) INSTRUCTION SWAP FOR PATCHING PROBLEMATIC INSTRUCTIONS IN A MICROPROCESSOR

(71) Applicant: International Business Machines Corporation, Armonk, NY (US)

(72) Inventors: Richard W. Doing, Raleigh, NC (US); Ronald Hall, Cedar Park, TX (US); Kevin N. Magill, Durham, NC (US); James O. Tingen, Raleigh, NC (US); Todd A. Venton, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 869 days.

(21) Appl. No.: 13/680,133

(22) Filed: Nov. 19, 2012

(65) Prior Publication Data
US 2014/0143521 A1    May 22, 2014

(51) Int. Cl.
*G06F 9/30* (2006.01)
*G06F 9/32* (2006.01)
*G06F 9/38* (2006.01)
*G06F 11/00* (2006.01)

(52) U.S. Cl.
CPC .......... *G06F 9/3017* (2013.01); *G06F 9/30145* (2013.01); *G06F 9/30181* (2013.01); *G06F 9/30185* (2013.01); *G06F 9/328* (2013.01); *G06F 9/382* (2013.01); *G06F 11/00* (2013.01)

(58) Field of Classification Search
None
See application file for complete search history.

(56) References Cited

U.S. PATENT DOCUMENTS

| | | | | | |
|---|---|---|---|---|---|
| 4,346,437 | A | * | 8/1982 | Blahut | G06F 9/30185 712/205 |
| 5,446,851 | A | * | 8/1995 | Yamaguchi | G06F 8/66 712/227 |
| 5,535,365 | A | * | 7/1996 | Barriuso | G06F 9/526 710/200 |
| 5,983,337 | A | * | 11/1999 | Mahalingaiah | G06F 8/66 712/209 |
| 6,141,740 | A | * | 10/2000 | Mahalingaiah | G06F 8/66 711/125 |
| 6,438,664 | B1 | * | 8/2002 | McGrath | G06F 9/24 711/102 |
| 6,631,463 | B1 | * | 10/2003 | Floyd | G06F 9/3017 712/227 |
| 6,670,895 | B2 | * | 12/2003 | Singh | G06F 9/30032 341/50 |
| 7,191,318 | B2 | * | 3/2007 | Tripathy | H04L 29/06 710/22 |
| 7,434,035 | B2 | * | 10/2008 | Busaba | G06F 9/30145 711/115 |
| 2002/0124161 | A1 | * | 9/2002 | Moyer | G06F 8/66 712/234 |
| 2004/0230777 | A1 | * | 11/2004 | Busaba | G06F 9/30145 712/226 |
| 2007/0226463 | A1 | * | 9/2007 | Chaudhry | G06F 9/30196 712/209 |
| 2007/0260826 | A1 | * | 11/2007 | Greiner | G06F 9/30021 711/154 |
| 2009/0182983 | A1 | * | 7/2009 | Greiner | G06F 9/30058 712/205 |

* cited by examiner

*Primary Examiner* — Steven Snyder
(74) *Attorney, Agent, or Firm* — Steven Meyers

(57) ABSTRACT

There is provided a method and system for replacing an instruction with another instruction. A match register stores an opcode that identifies an instruction to be replaced. A swap register stores an instruction that replaces the identified instruction. A multiplexer chooses the instruction stored in the swap register over the identified instruction if predecode bits of the identified instruction are set.

19 Claims, 3 Drawing Sheets

INSTRUCTION SWAP FOR PATCHING PROBLEMATIC INSTRUCTIONS IN A MICROPROCESSOR

BACKGROUND

This disclosure relates generally to computer architecture, and particularly to a method and a system for swapping a processor-issued instruction with any other instruction with no performance impact.

BACKGROUND OF THE INVENTION

A multithreaded processor includes hardware resources, e.g., a plurality of processor cores, which support running of a plurality of software threads in parallel. A logical partition (LPAR) refers to dividing computer hardware resources, e.g., a processor core, into multiple computing environments, each of which runs independently each other. Each logical partition may run an independent application and operating system. Logical partitions may communicate with each other, e.g., via an interconnect, etc. Dynamic Logical Partition refers to a technique that enables a logical partition to reconfigure dynamically without shutting down software applications and operating system(s) running on that logical partition. Dynamic Logical Partition technique enables a microprocessor to automatically re-allocate hardware resources between logical partitions without stopping of software applications running on those logical partitions.

SUMMARY

There is provided a system for providing an instruction to a processor core. A match register in the system stores at least one opcode that identifies at least one instruction to be swapped. An instruction fetch logic device receives an incoming instruction to be run by the processor core, identifies an opcode of the incoming instruction, and stores the identified opcode of the incoming instruction in an instruction register. A mask register stores mask bits used to enable or disable a comparison between the opcode stored in the match register and the opcode stored in the instruction register. A predecode logic device receives the opcode stored in the match register and the opcode stored in the instruction register, enables the comparison between the opcode stored in the instruction register and the opcode stored in the match register if the mask bits are set, and disables the comparison between the opcode stored in the instruction register and the opcode stored in the match register if the mask bits are unset. The predecode logic device receives the incoming instruction from the instruction fetch logic device, sets predecode bits in the received incoming instruction upon finding, based on the comparison, a match between the opcode stored in the instruction register and the opcode stored in the match register, otherwise unsets the predecode bits in the received incoming instruction, and stores the received incoming instruction in an instruction cache memory device. A decode logic device fetches an instruction from the instruction cache memory device, and determines whether the predecode bits of the fetched instruction are set. A swap register stores an instruction that can be swapped in a place of the fetched instruction. A multiplexer replaces the fetched instruction with the instruction stored in the swap register if the predecode bits of the fetched instruction are set.

In order to replace the fetched instruction with the instruction stored in the swap register, the multiplexer receives the instruction stored in the swap register and the fetched instruction, chooses the instruction stored in the swap register if the predecode bits of the fetched instruction are set, chooses the fetched instruction if the predecode bits of the fetched instruction are not set, and provides the chosen instruction to a further processing logic device.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
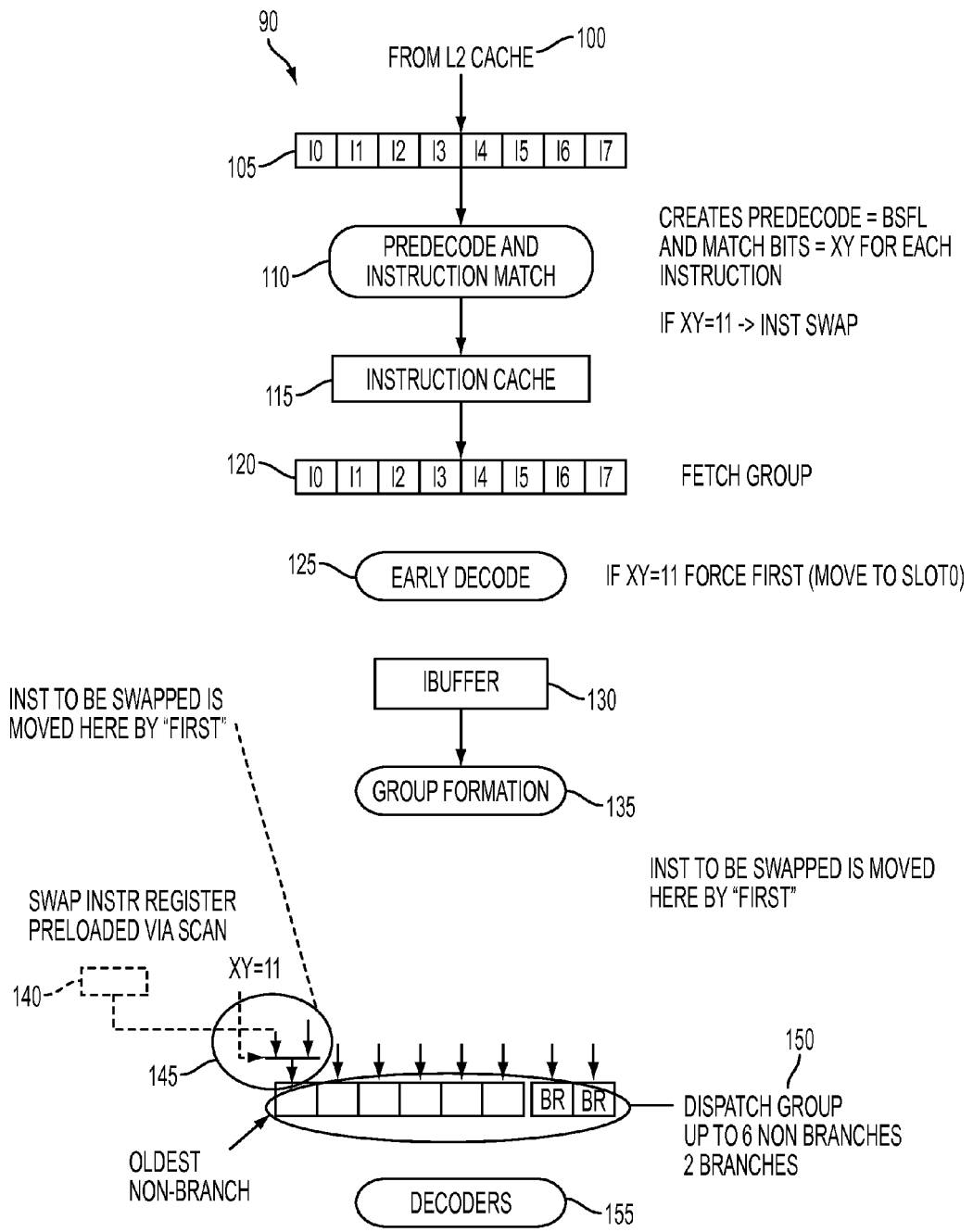
FIG. 1 illustrates a computing system by which an instruction is replaced with a completely different instruction.
Figure 2:
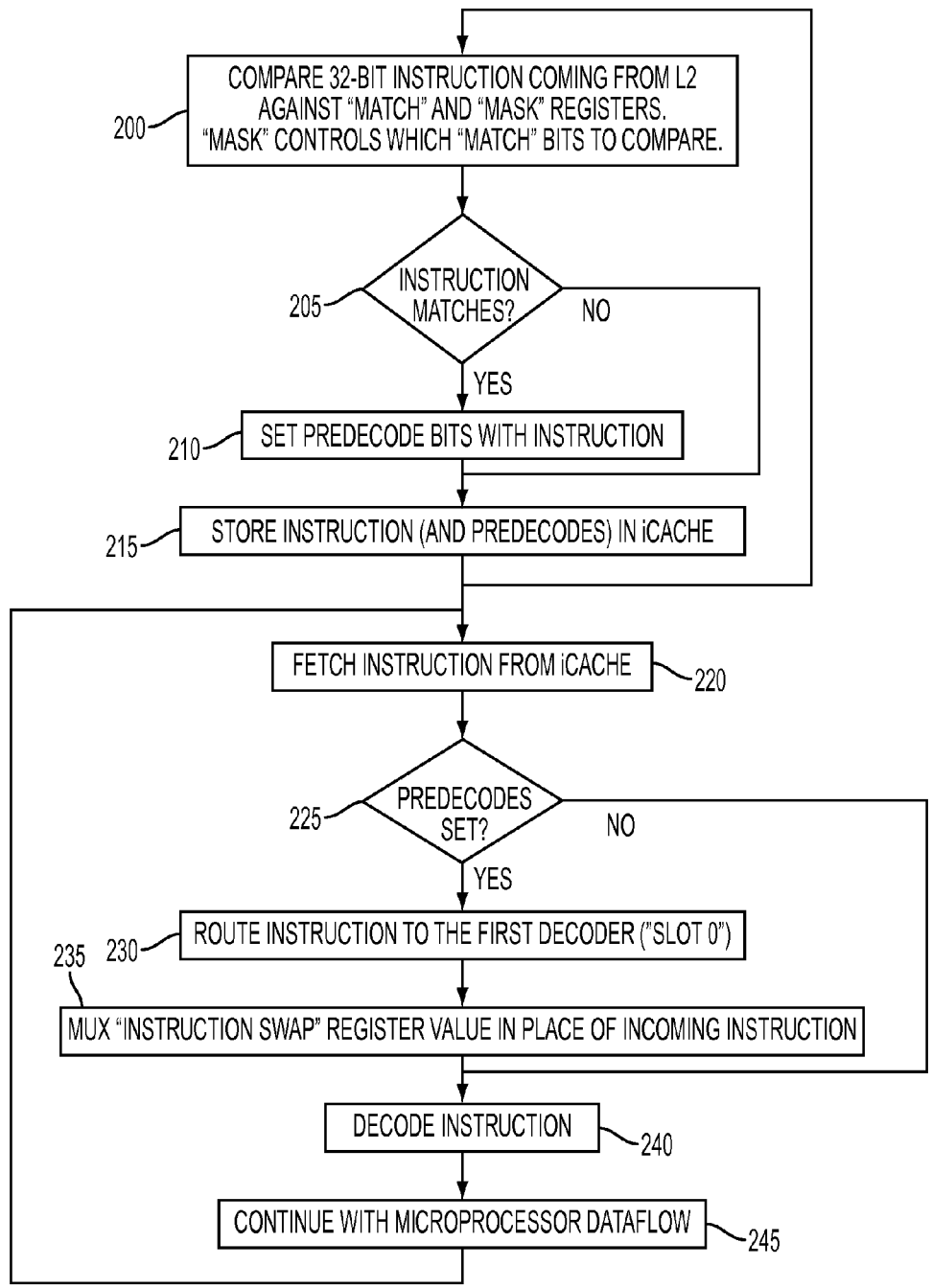
FIG. 2 illustrates a flow chart describing method steps for replacing an instruction with a completely different instruction.
Figure 3:
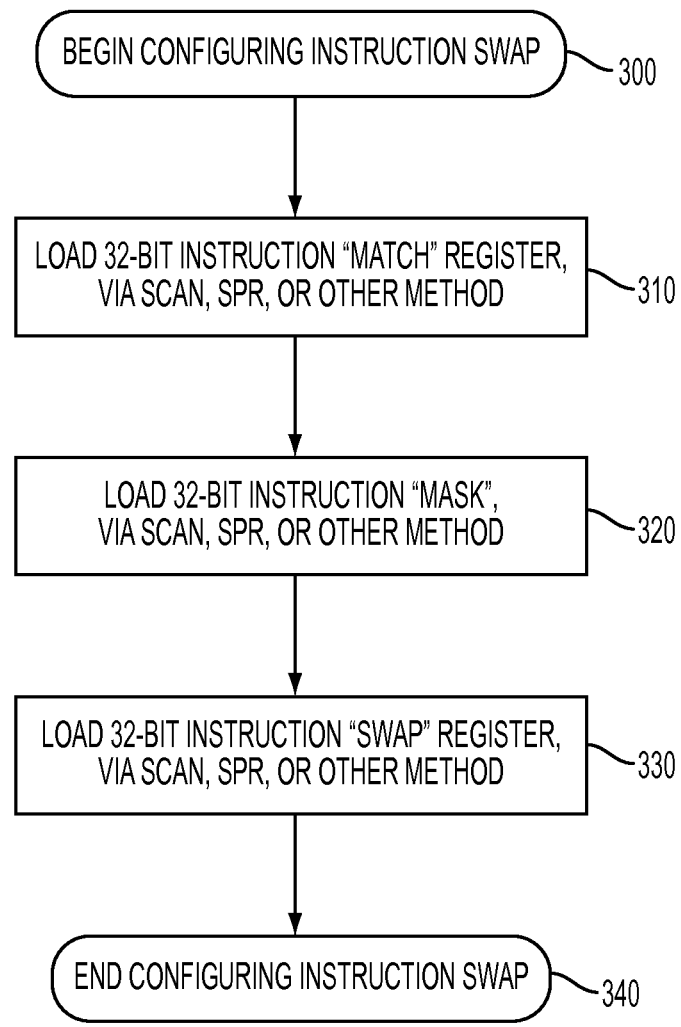
FIG. 3 illustrates a flow chart describing method steps for loading instructions or opcodes into the match register, the mask register and the swap register.

FIG. 1 illustrates a portion of a computing system 90 for swapping an in-flight instruction with a completely different instruction with no performance penalty or with minimal performance penalty. FIG. 2 illustrates a flow chart describing method steps run by the system depicted in FIG. 1. FIG. 3 illustrates method steps used to load opcodes or instructions to a match register, a mask register or a swap register. In one embodiment, method systems in FIG. 3 are performed before the system 90 runs the method steps in FIG. 2.

In FIG. 3, at step 300, a user determines what opcode(s) or instruction(s) is (are) going to be loaded to a match register. In one embodiment, a match register is used to store at least one opcode (e.g., 32-bit opcode, etc.) that identifies at least one instruction to be swapped in favor of a replacement instruction. In another embodiment, a match register is used to store at least one instruction to be swapped with another instruction. In order to determine the instruction to be swapped, the user may consider one or more factors of:

(1) a purpose of swapping an instruction with another instruction, for example,
   a. in order to replace a first instruction causing a conflict with a second instruction;
   b. in order to guarantee code compatibility: granting or denying an access by an instruction to memory addresses owned by a software application;
   c. in order to improve performance of a corresponding microprocessor: updating an instruction set architecture, e.g., by replacing an instruction that consumes a hundred clock cycles with one or more instructions which require less than a hundred clock cycle to run all those instructions but generate a same computation result as if the replaced instruction is run;
   d. in order to perform cross-compiling (i.e., automatically translating instructions written in an instruction set architecture to different instructions that conform to a different instruction set architecture).
(2) an instruction set of a corresponding microprocessor;
(3) a performance effect caused by the swapped-out instruction, e.g., whether the swapped-out instruction requires a memory access that spends hundreds of clock cycles; and
(4) a consequence of swapping an instruction with another instruction, e.g., whether an eventual computation result will be changed or unaffected though an instruction is swapped with another instruction. The user may intend that a same computation result is generated though a particular instruction is swapped with one or more instructions. Before actually loading the particular instruction into the match register and before actually loading the one or more instructions into the swap register, the user may verify that the same computation result is generated after swapping the particular instruction with the one or more instructions, e.g., by running a known compatible assembly language simulator. Alternatively, the user may intend that a different computation result is generated by swapping the particular instruction with the one or more instructions. Again, before actually loading the particular instruction into the match register and before actually loading the one or more instructions into the swap register, the user may verify, e.g., by running a known compatible assembly language simulator, whether the user can obtain the intended different computation generated by swapping the particular instruction with the one or more instructions.

At step 310, based on one or more of these factors, the user chooses at least one opcode that identifies at least one instruction to be swapped and stores the chosen opcode in the match register, e.g., by using a scanning technique, a special purpose register (SPR) or other method(s). Alternatively, the user loads at least one instruction, which identifies one or more instructions to be swapped, into the match register, e.g., by using the scanning technique, SPR or other methods. Scanning technique refers to loading data or instruction to a register by using a serial "sideband" while all the functions in a corresponding processor are stopped. System firmware may also use this scanning technique to pre-load registers with known values before initiating a boot sequence on the processor. Thus, by using the scanning technique, the chosen opcode is load into the match register by using the serial sideband before a corresponding processor perform any computational operation.

SPR is a software-accessible register that is typically used for setting controls and/or reading status of some aspect of a corresponding machine. In contrast to the scanning technique, an SPR would allow software (hypervisor, operating system, etc.) to load the chosen opcode into the match register while the corresponding processor is functionally operating, e.g., via a "move to SPR" IBM® PowerPC® instruction. SPR gives software more flexibility to change the swap configuration at any time: opcode(s) stored in the match register can be changed anytime while the corresponding processor is performing a computational operation.

Returning to FIG. 3, at step 320, the user loads mask bits (e.g., a series of ones) into the mask register, e.g., by using the scanning technique, the SPR, or other methods. In one embodiment, the mask bits are set to all "ones" in order to enable a comparison between an opcode stored in the match register and an opcode stored in an instruction register. In another embodiment, the mask bits are set to all "zeroes" in order to disable the comparison between the opcode stored in the match register and the opcode stored in the instruction register. In another embodiment, the mask bits are set to mix of "ones" and "zeroes."

Returning to FIG. 3, at step 330, the user loads one or more instructions, which replaces the instruction(s) identified by opcode(s) stored in the match register, into a swap register, e.g., by using the scanning technique, the SPR, or other methods. In one embodiment, the one or more instructions stored in the swap register can be changed, e.g., e.g., via a "move to SPR" IBM® PowerPC® instruction, while a corresponding processor is performing a computational operation. The instruction(s) stored in the swap register may be instructions completely different from the instructions identified by the opcodes stored in the match register. In order to guarantee computation correctness after swapping of the instructions, the user may run a known compatible assembly simulator (e.g., PSIM, etc.) before actually loading the one or more instructions to the swap register and before actually loading opcodes to the match register. PSIM is a software program that simulates running of an assembly language program written in IBM® PowerPC® instruction set architecture. At step 340, the user completes configuring the match register, the mask register and the swap register.

An operation of the system 90 in FIG. 1 is described below according to method steps in FIG. 2. An instruction fetch logic device (not shown) retrieves an instruction from a cache memory device, e.g., a level-two cache memory device 100 shown in FIG. 1, and identifies an opcode of the retrieved instruction in an instruction register 105 shown in FIG. 1, e.g., by using one or more pre-determined mask bits. In one embodiment, the retrieved instruction is a non-branch instruction, e.g., load instruction, store instruction, etc. In another embodiment, the retrieved instruction can be any instruction, e.g., a branch instruction, jump instruction, add instruction, load instruction, etc. The instruction fetch logic device stores the identified opcode of the retrieved instruction in an instruction register (not shown). At step 200 in FIG. 2, a predecode logic device 110 shown in FIG. 1 receives the opcode stored in the match register and the opcode stored in the instruction register.

Then, in step 205 in FIG. 2, the predecode logic device 110 compares between the opcode stored in the instruction register and the opcode stored in the match register if the mask bits are set (i.e., 1111_1111_1111_1111, etc.), e.g., by using a hardware comparator. The predecode logic device 110 does not perform the comparison between the opcode stored in the instruction register and the opcode stored in the match register if the mask bits are unset (i.e., 0000_0000_0000_0000, etc.). In one embodiment, the match register stores two or more opcodes. The predecode logic device compares the opcode stored in the instruction register against all the opcodes stored in the match register, e.g., by using a hardware comparator or like logic device (not shown).

At step 210 in FIG. 2, the predecode logic device 110 receives the incoming instruction from the instruction fetch logic device, sets predecode bits in the received incoming instruction upon finding, based on the comparison, a match between the opcode stored in the instruction register and the opcode stored in the match register. The predecode logic device 110 unsets (i.e., does not set) the predecode bits in the received incoming instruction upon finding no match between the opcode stored in the instruction register and the opcode stored in the match register. The predecode bits of the received incoming instruction may be set differently depending on which opcode, stored in the match register, is matched to the opcode stored in instruction register. For example, an opcode in a first field of the match register is found to be matched to the opcode stored in instruction register, the predecode bits of the received incoming instruction may be set to "001." If an opcode in a second field of the match register is found to be matched to the opcode stored in instruction register, the predecode bits of the received incoming instruction may be set to "010." If no match is found between the opcode stored in the instruction register and opcode(s) stored in the match register, the predecode logic device 110 unsets the predecode bits in the received incoming instruction, and the process proceeds to step 215 in FIG. 2. "XY=11" in FIG. 1 refers to an example of setting predecode bits ("XY") in the received instruction.

In one embodiment, the mask register stores mask bits, which are mix of ones and zeroes. The predecode logic device 110 receives the opcode stored in the match register and the opcode stored in the instruction register. The predecode logic device 110 masks the opcode stored in the match register by using the mask bits in order to generate a first masked opcode. The predecode logic device 110 masks the opcode stored in the instruction register by using the mask bits in order to generate a second masked opcode. The predecode logic device 110 compares between the first masked opcode and the second masked opcode, e.g., by using a hardware comparator or an equivalent logic device (not shown). The predecode logic device 110 receives the incoming instruction from the instruction fetch logic device. The predecode logic device 110 sets the predecode bits in the incoming instruction upon finding, based on the comparison, a match between the first masked opcode and the second masked opcode. The predecode logic device 110 unsets the predecode bits in the incoming instruction upon finding no match between the first masked opcode and the second masked opcode.

At step 215 in FIG. 2, the predecode logic device 110 stores the received instruction, which includes the set or unset predecode bits, in an instruction cache memory device 115 shown in FIG. 1. Alternatively, the predecode logic device 110 stores the received instruction with the set or unset predecode bits in a data store (called "Fetch Group" 120 shown in FIG. 1). Steps 200-215 in FIG. 2 may be repeated until all the instructions stored in the level-two cache memory device 110 are processed according to steps 200-215 in FIG. 2.

In one embodiment, the predecode logic device 110 is implemented by a connection of logic gates, e.g., "AND" gate, "OR" gate, "Exclusive-OR" gate, etc. In another embodiment, the predecode logic device 110 is implemented as hardware on a reconfigurable hardware (e.g., FPGA (Field Programmable Gate Array) or CPLD (Complex Programmable Logic Device)) by using a hardware description language (Verilog, VHDL, Handel-C, or System C). In a further embodiment, the predecode logic device 110 is implemented on a semiconductor chip (e.g., ASIC (Application-Specific Integrated Circuit)) by using a semi custom design methodology (i.e., designing a chip using standard cells and a hardware description language).

At step 220 in FIG. 2, an early decode logic device 125 shown in FIG. 1 fetches an instruction from the instruction cache memory device 115 or the data store 120. At step 225 in FIG. 2, the early decode logic device 125 determines whether the predecode bits of the fetched instruction are set. Upon determining that the predecode bits of the fetched instruction are unset, the fetched instruction is forwarded to a further processing device in order to decode the fetched instruction at step 240 and to further process the fetched instruction according to a datapath in the processor core at step 245.

Upon determining that the predecode bits of the fetched instruction are set, at step 230, the early decode logic device dispatches the fetched instruction whose predecode bits are set to a specific slot (e.g., the first slot) in a dispatch group 150. A dispatch group refers to a group of instructions (e.g., six non-branch instructions and two branch instructions) that are dispatched to a further logic device (e.g., a decoder logic device 155 shown in FIG. 1). In one embodiment, a group formation logic device 135 forms the dispatch group, e.g., by fetching of instructions from the instruction buffer 130 or the instruction cache memory device 115 or the data store 120, and arranging of these fetched instructions. The group formation logic device 135 invoked by the early decode logic device 125 places the fetched instruction whose predecode bits are set to the specific slot in the dispatch group 150. If the predecode bits of the fetched instruction are unset, the group formation logic device 135 places the fetched instruction in any available slot according to an opcode of the fetched instruction.

In one embodiment, the early decode logic device 125 is implemented by a connection of logic gates, e.g., "AND" gate, etc. In another embodiment, the early decode logic device 125 is implemented as hardware on a reconfigurable hardware (e.g., FPGA (Field Programmable Gate Array) or CPLD (Complex Programmable Logic Device)) by using a hardware description language (Verilog, VHDL, Handel-C, or System C). In a further embodiment, the early decode logic device 125 is implemented on a semiconductor chip (e.g., ASIC (Application-Specific Integrated Circuit)) by using a semi custom design methodology (i.e., designing a chip using standard cells and a hardware description language). The group formation logic device 135 may also be implemented, e.g., by the reconfigurable hardware or ASIC.

In one embodiment, all instructions dispatched to the specific slot in the dispatch group 150 are provided to a multiplexer 145 in order to be replaced with an instruction stored in the swap register 140. The swap register 140 stores an instruction that can replace another instruction placed in the specific slot of the dispatch group 150. At step 235 in FIG. 2, the multiplexer 145 receives an instruction from the specific slot of the dispatch group 150 and receives the instruction stored in the swap register 140. The multiplexer 145 replaces the instruction received from the specific slot of the dispatch group 150 with the instruction stored in the swap register if the predecode bits of the instruction, which is received from the specific slot of the dispatch group 150, are set.

Specifically, the multiplexer 145 chooses the instruction stored in the swap register if the predecode bits of the instruction, which is received from the specific slot of the dispatch group 150, are set. If the predecode bits of the instruction, which are received from the specific slot of the dispatch group 150, are not set, the multiplexer 145 chooses the instruction received from the specific slot of the dispatch group 150. Then, at steps 240-245 in FIG. 2, the multiplexer 145 provides the chosen instruction to a further processing logic device, e.g., a decoder logic device 155 shown in FIG. 1. Steps 220-245 in FIG. 2 are repeated until all the instructions in the instruction cache memory device 115 are processed according to method steps 220-245 in FIG. 2.

In one embodiment, the early decode logic device 125 fetches an instruction from the instruction cache memory device 115 and determines whether the predecode bits of the fetched instruction are set. Upon determining that the predecode bits of the fetched instruction are set, the early decode logic device 125 provides the fetched instruction to the multiplexer 145. The multiplexer 145 replaces the fetched instruction with an instruction stored in the swap register 140. In order to replace the fetched instruction with the instruction stored in the swap register 140, the multiplexer receives the instruction stored in the swap register and the fetched instruction, chooses the instruction stored in the swap register if the predecode bits of the fetched instruction are set, chooses the fetched instruction if the predecode bits of the fetched instruction are not set, and provides the chosen instruction to a further processing logic device.

In one embodiment, the swap register 140 stores two or more instructions to replace the fetched instruction. A multiplexer 145 chooses an instruction stored in the swap register 140 according to the predecode bits set in the fetched instruction. For example, if the predecode bits of the fetched instruction are set to "001," an instruction stored in the first field of the swap register 140 is chosen by the multiplexer 145 in order to replace the fetched instruction. If the predecode bits of the fetched instruction are set to "010," an instruction stored in the second field of the swap register 140 is chosen by the multiplexer 145 in order to replace the fetched instruction. The multiplexer 140 provides the chosen instruction to a further processing device, e.g., the decoder logic device 155. The fetched instruction is no longer forwarded to the further processing device.

In one embodiment, the system 90 shown in FIG. 1 supports one or more actions of: (1) Force Nop; (2) Serialize; and (3) Debug mark. Under "Force Nop," the swap register 140 stores Nop instruction (i.e., an instruction doing nothing). The multiplexer 145 replaces the fetched instruction with the Nop instruction if predecode bits of the fetched instruction are set. Under "Serialize," an instruction identified by the opcode stored in the match register is forced to move through some stages (e.g., register file access, memory access, etc.) of a corresponding processor core by itself rather than being grouped with other instructions in the dispatch group 150. Under "Debug mark," an instruction identified by the opcode in the match register is appended with a "tag," which causes some actions to be taken later, for example, flushing or re-fetching younger instructions at the time that the identified instruction is completed.

In one embodiment, the system 90 shown in FIG. 1 can be used in a design-in patching logic circuit in a microprocessor that can be used to fix errors or problems detected in a microprocessor design. The system 90 can be further used as a switch to enable or disable functions in a programmable logic device that is configured to detect logic scenario and take actions to correct problems in the microprocessor design.

In an exemplary embodiment, by using the system in FIG. 1 and the method steps in FIGS. 2-3, a user can configure to automatically swap a SYNC instruction with a LWSYNC instruction after the SYNC instruction is fetched from the level-two cache memory device 100 but before the SYNC is run by any processing device. SYNC instruction refers to an instruction that ensures that all prior memory and bus transactions in an entire microprocessor are completed before any other instruction is issued. LWSYNC refers to an instruction that ensures that all prior memory and bus transactions in a local processor core are completed before any other instruction is issued.

In another exemplary embodiment, by using the system in FIG. 1 and the method steps in FIGS. 2-3, a user can configure to replace a complicated load instruction (e.g., "Load and Reserve" instruction, etc.) with a different load instruction, a Nop instruction or any other instruction. "Load and Reserve" instruction refers to an instruction that ensures no other processor or thread modifies a memory location from the time that the "Load and Reserve" instruction is run to the time that a corresponding store instruction is completed.

In one embodiment, a processor core supports a plurality of concurrent logical partitions, each of which runs independent and isolated software program as if the processor core includes a plurality of different processor cores. Each logical partition is independent from other logical partitions. Each logical partition includes a separate match register, a separate mask register, a separate instruction register, a separate predecode logic device, a separate decode logic device, a separate swap register, and a separate multiplexer, whereby each logical partition perform replacing of an instruction with another instruction independently of other logical partitions.

In a further embodiment, in a first logical partition, an instruction having a first opcode is replaced with an instruction having a second opcode different from the first opcode, e.g., by using the system 90 shown in FIG. 1. In a second logical partition, an instruction having the same first opcode is replaced with an instruction having a third opcode different from the first and second opcodes, e.g., by using the system 90 shown in FIG. 1. In this embodiment, the swap register in the first logical partition stores the replacing instruction having the second opcode. The swap register in the second logical partition stores the replacing instruction having the third opcode.

In a further embodiment, each logical partition runs a different thread. Thereby, each thread running a same high-level programming code generates a different instruction stream based on each different instruction replacement mechanism in each different logical partition, e.g., each swap register in each logical partition stores each different instruction.

The use of the system 90 shown in FIG. 1, in order to swap an instruction with another instruction, does not cause any performance impact on a corresponding processor core: because the swapped-in instruction is placed in the position of the swapped-out instruction without causing any clock cycle delay, an instruction stream including the swapped-instruction is processed as if an original instruction stream including the swapped-out instruction is processed. Note that one skilled in the art would be able to determine a critical path and critical stage in a microprocessor design. A clock cycle of the microprocessor would be determined by the critical path and/or the critical stage. Normally, the critical stage may include an access to a memory device. Steps 200-235 in FIG. 2 may be performed in an instruction fetch stage, which usually takes less processing time than the memory access stage. Therefore, the implementation of system 90 in an instruction fetch unit does not cause any performance degradation, e.g., slowing clock frequency or less throughput.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for providing an instruction to a processor core in a multi-core microprocessor, the apparatus comprising:

a match register storing an opcode that identifies an instruction to be replaced;

an instruction fetch logic device receiving an incoming instruction to be run by the processor core, identifying an opcode of the incoming instruction, and storing the identified opcode of the incoming instruction in an instruction register;

a swap register storing in a first field a first instruction and in a second field a second instruction, wherein one of the first instruction and the second instruction replaces the identified instruction;

a comparator determining whether the opcode stored in the instruction register and the opcode stored in the match register are same; and a multiplexer replacing the incoming instruction with one of the first and second instructions stored in the swap register in response to determining that the opcode stored in the instruction register and the opcode stored in the match register are same;

wherein in order to replace the incoming instruction with one of the first and second instructions stored in the swap register, the comparator sets predecode bits in the incoming instruction in response to determining that the opcode stored in the instruction register and the opcode stored in the match register are same, wherein the predecode bits are set in a first pattern when the first instruction stored in the swap register is to replace the incoming instruction, wherein the predecode bits are set in a second pattern, different from the first pattern, when the second instruction stored in the swap register is to replace the incoming instruction, wherein the multiplexer chooses the first instruction stored in the swap register if the predecode bits are set to the first pattern, wherein the multiplexer chooses the second instruction stored in the swap register if the predecode bits are set to the second pattern, and wherein the multiplexer provides the chosen one of the first and second instructions to a further processing device in the processor core.

2. The apparatus according to claim 1, wherein the replacing the incoming instruction does not cause any performance impact to the processor core.

3. A system for providing an instruction to a processor core, the system comprising:

a match register storing at least one opcode that identifies at least one instruction to be swapped;

an instruction fetch logic device receiving an incoming instruction to be run by the processor core, identifying an opcode of the incoming instruction, and storing the identified opcode of the incoming instruction in an instruction register;

a mask register storing mask bits used to enable or disable a comparison between the opcode stored in the match register and the opcode stored in the instruction register;

a predecode logic device receiving the opcode stored in the match register and the opcode stored in the instruction register, enabling the comparison between the opcode stored in the instruction register and the opcode stored in the match register if the mask bits are set, and disabling the comparison between the opcode stored in the instruction register and the opcode stored in the match register if the mask bits are unset;

the predecode logic device receiving the incoming instruction from the instruction fetch logic device, setting predecode bits in the received incoming instruction upon finding, based on the comparison, a match between the opcode stored in the instruction register and the opcode stored in the match register, otherwise unsetting the predecode bits in the received incoming instruction, and storing the received incoming instruction in an instruction cache memory device;

a decode logic device fetching an instruction from the instruction cache memory device and determining whether the predecode bits of the fetched instruction are set;

a swap register storing an instruction that can be swapped in a place of the fetched instruction; and a multiplexer for replacing the fetched instruction with the instruction stored in the swap register if the predecode bits of the fetched instruction are set;

wherein the processor core supports a plurality of concurrent logical partitions, each of which runs an independent and isolated software program as if the processor core includes a plurality of different processor cores, and each logical partition is independent from other logical partitions, each logical partition includes a separate match register, a separate mask register, a separate instruction register, a separate predecode logic device, a separate decode logic device, a separate swap register, and a separate multiplexer, whereby each logical partition performs replacing of an instruction with another instruction independently of other logical partitions; and wherein the instruction stored in the swap register is an instruction different from the fetched instruction.

4. The system according to claim 3, wherein, for a given one of the logical partitions, in order to replace the fetched instruction with the instruction stored in the swap register, the multiplexer receives the instruction stored in the swap register and the fetched instruction, chooses the instruction stored in the swap register if the predecode bits of the fetched instruction are set, chooses the fetched instruction if the predecode bits of the fetched instruction are not set, and provides the chosen instruction to a further processing logic device.

5. The system according to claim 3, wherein, for a given one of the logical partitions, the match register, the mask register, and the swap register is loaded by using one or more of: a scanning technique and a special purpose register (SPR).

6. The system according to claim 3, wherein, for a given one of the logical partitions, the instruction in the swap register can be changed while the processor is processing instructions.

7. The system according to claim 3, wherein, for a given one of the logical partitions, the decode logic device dispatches the fetched instruction whose predecode bits are set to a specific slot in a dispatch group and dispatches the fetched instruction whose predecode bits are unset to another slot in the dispatch group.

8. The system according to claim 7, wherein, for a given one of the logical partitions, all instructions dispatched to the specific slot in the dispatch group are provided to the multiplexer in order to be replaced with the instruction in the swap register.

9. The system according to claim 3, wherein in a first logical partition an instruction having a first opcode is replaced with an instruction having a second opcode different from the first opcode, and in a second logical partition an instruction having the same first opcode is replaced with an instruction having a third opcode different from the first and second opcodes.

10. The system according to claim 9, wherein each logical partition runs a different thread, whereby each thread running a same high-level programming code generates a different instruction stream based on each different instruction replacement mechanism in each different logical partition.

11. The system according to claim 3, wherein, for a given one of the logical partitions:

the mask register stores different mask bits;

the predecode logic device receives the opcode stored in the match register and the opcode stored in the instruction register, masks the opcode stored in the match register by using the different mask bits in order to generate a first masked opcode, masks the opcode stored in the instruction register by using the different mask bits in order to generate a second masked opcode, and compares between the first masked opcode and the second masked opcode; and the predecode logic device receives the incoming instruction from the instruction fetch logic device, sets predecode bits in the incoming instruction upon finding, based on the comparison, a match between the first masked opcode and the second masked opcode, otherwise unsets the predecode bits in the incoming instruction, and stores the received incoming instruction in the instruction cache memory device.

12. A method for providing an instruction to a processor core, the method comprising:

storing, in a match register, at least one opcode that identifies at least one instruction to be swapped;

receiving, at an instruction fetch logic device, an incoming instruction to be run by the processor core, identifying an opcode of the incoming instruction, and storing the identified opcode of the incoming instruction in an instruction register;

storing, in a mask register, mask bits used to enable or disable a comparison between the opcode stored in the match register and the opcode stored in the instruction register;

receiving, at a predecode logic device, the opcode stored in the match register and the opcode stored in the instruction register, enabling the comparison between the opcode stored in the instruction register and the opcode stored in the match register if the mask bits are set, and disabling the comparison between the opcode stored in the instruction register and the opcode stored in the match register if the mask bits are unset;

receiving, at the predecode logic device, the incoming instruction from the instruction fetch logic device, setting predecode bits in the received incoming instruction upon finding, based on the comparison, a match between the opcode stored in the instruction register and the opcode stored in the match register, otherwise unsetting the predecode bits in the received incoming instruction, and storing the received incoming instruction in an instruction cache memory device;

fetching, by a decode logic device, an instruction from the instruction cache memory device and determining whether the predecode bits of the fetched instruction are set;

storing, in a swap register, an instruction that can be swapped in a place of the fetched instruction; and replacing, by a multiplexer, the fetched instruction with the instruction stored in the swap register if the predecode bits of the fetched instruction are set;

wherein the processor core supports a plurality of concurrent logical partitions, each of which runs an independent and isolated software program as if the processor core includes a plurality of different processor cores, and each logical partition is independent from other logical partitions, each logical partition includes a separate match register, a separate mask register, a separate instruction register, a separate predecode logic device, a separate decode logic device, a separate swap register, and a separate multiplexer, whereby each logical partition performs replacing of an instruction with another instruction independently of other logical partitions; and wherein the instruction stored in the swap register is an instruction different from the fetched instruction.

13. The method according to claim 12, wherein, for a given one of the logical partitions, in order to replace the fetched instruction with the instruction stored in the swap register, the multiplexer receives the instruction stored in the swap register and the fetched instruction, chooses the instruction stored in the swap register if the predecode bits of the fetched instruction are set, chooses the fetched instruction if the predecode bits of the fetched instruction are not set, and provides the chosen instruction to a further processing logic device.

14. The method according to claim 12, wherein, for a given one of the logical partitions, the match register, the mask register, and the swap register is loaded by using one or more of: a scanning technique and a special purpose register (SPR).

15. The method according to claim 12, wherein, for a given one of the logical partitions, the instruction in the swap register can be changed while the processor is processing instructions.

16. The method according to claim 12, further comprising, for a given one of the logical partitions:
dispatching the fetched instruction whose predecode bits are set to a specific slot in a dispatch group and dispatching the fetched instruction whose predecode bits are unset to another slot in the dispatch group.

17. The method according to claim 16, wherein, for a given one of the logical partitions, all instructions dispatched to the specific slot in the dispatch group are provided to the multiplexer in order to be replaced with the instruction in the swap register.

18. The method according to claim 12, wherein in a first logical partition an instruction having a first opcode is replaced with an instruction having a second opcode different from the first opcode, and in a second logical partition an instruction having the same first opcode is replaced with an instruction having a third opcode different from the first and second opcodes.

19. The method according to claim 18, wherein each logical partition runs a different thread, whereby each thread running a same high-level programming code generates a different instruction stream based on each different instruction replacement mechanism in each different logical partition.

* * * * *